(12) United States Patent
Auerbach

(10) Patent No.: US 7,761,572 B1
(45) Date of Patent: Jul. 20, 2010

(54) PROXIMITY AS AN AID TO CACHING AND SECONDARY SERVING OF DATA

(75) Inventor: Karl G. Auerbach, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/902,971

(22) Filed: Jul. 30, 2004

Related U.S. Application Data

(63) Continuation of application No. 09/283,676, filed on Apr. 1, 1999, now Pat. No. 6,832,253.

(51) Int. Cl.
*G06F 15/16* (2006.01)

(52) U.S. Cl. ........................ 709/226; 709/203; 709/200; 370/235; 711/150; 715/744

(58) Field of Classification Search ......... 709/203–239, 709/200, 271, 226, 235; 370/238–408, 235; 395/200–404
See application file for complete search history.

(56) References Cited

U.S. PATENT DOCUMENTS

| | | | |
|---|---|---|---|
| 5,459,837 A | | 10/1995 | Caccavale |
| 5,805,165 A | * | 9/1998 | Thorne et al. ............... 715/823 |
| 5,854,899 A | * | 12/1998 | Callon et al. ............... 709/238 |
| 5,881,231 A | * | 3/1999 | Takagi et al. ............... 709/212 |
| 5,924,116 A | * | 7/1999 | Aggarwal et al. ........... 711/122 |
| 6,006,264 A | | 12/1999 | Colby et al. |
| 6,049,829 A | | 4/2000 | Li |
| 6,065,058 A | | 5/2000 | Hailpern et al. |
| 6,070,190 A | | 5/2000 | Reps et al. |
| 6,084,858 A | * | 7/2000 | Matthews et al. ........... 370/238 |
| 6,115,752 A | | 9/2000 | Chauhan |
| 6,151,319 A | * | 11/2000 | Dommety et al. ...... 370/395.52 |
| 6,157,925 A | | 12/2000 | Jenkins et al. |
| 6,167,438 A | | 12/2000 | Yates et al. |

(Continued)

OTHER PUBLICATIONS

A product/service known as Exodus was available prior to Apr. 1, 1999. (The appended description of Exodus describes the product as it exists on Dec. 26, 2000). Printout from Website http://www.exodus.net, Printed on Dec. 26, 2000, 4 Pages.

(Continued)

*Primary Examiner*—Saleh Najjar
*Assistant Examiner*—Thuong (Tina) T Nguyen
(74) *Attorney, Agent, or Firm*—Weaver Austin Villeneuve & Sampson LLP

(57) ABSTRACT

A proximity-based content control method "propagates" or positions content based upon "proximity" between various nodes on a network. The nodes between which the content is propagated include content libraries, servers, and clients. In one case, the relative proximities of two content servers to a particular client or group of clients determines which of these servers serves client requests. In another case, the method employs anticipatory loading of content from a library to a server based upon the server's proximity to a given client-base. Yet another application involves adding or removing server capacity to a network based upon proximity to clients. Another application applies proximity affects to cache release algorithms. A "content control system" calculates proximity dynamically and automatically decides whether to move content based upon the proximity calculation.

23 Claims, 8 Drawing Sheets

U.S. PATENT DOCUMENTS

| | | | |
|---|---|---|---|
| 6,205,146 B1 * | 3/2001 | Rochberger et al. | 370/395.53 |
| 6,205,481 B1 | 3/2001 | Heddaya et al. | |
| 6,230,204 B1 | 5/2001 | Fleming, III | |
| 6,253,234 B1 | 6/2001 | Hunt et al. | |
| 6,256,675 B1 | 7/2001 | Rabinovich | |
| 6,260,061 B1 | 7/2001 | Krishnan et al. | |
| 6,260,070 B1 | 7/2001 | Shah | |
| 6,279,001 B1 | 8/2001 | DeBettencourt et al. | |
| 6,298,381 B1 * | 10/2001 | Shah et al. | 709/228 |
| 6,353,847 B1 | 3/2002 | Maruyama et al. | |
| 6,385,699 B1 | 5/2002 | Bozman et al. | |
| 6,421,732 B1 | 7/2002 | Alkhatib et al. | |
| 6,477,143 B1 * | 11/2002 | Ginossar | 370/230 |
| 6,484,204 B1 * | 11/2002 | Rabinovich | 709/226 |
| 2002/0013856 A1 * | 1/2002 | Garcia-Luna-Aceves et al. | 709/238 |
| 2003/0061282 A1 * | 3/2003 | Ebata et al. | 709/203 |

OTHER PUBLICATIONS

Press Release regarding "InterVU, Inc. patent" Dec. 1, 1998, 3 Pages.

Dhaval N. Shah et al., "*System and Method for Measuring Round Trip Times in a Network Using A TCP Packet*", U.S. Appl. No. 09/087,689, filed May 26, 1998, 21 Pages.

Dhaval N. Shah, "*A System and Method for Determining a Preferred Mirrored Service in a Network by Evaluating a Border Gateway Protocol*", U.S. Appl. No. 09/107,246, filed Jun. 30, 1998, 37 Pages.

Dhaval N. Shah, et al., "*A System and Method for Determining a Preferred Service in a Network*", U.S. Appl. No. 09/175,673, file Date: Oct. 20, 1998, 75 Pages.

Dhaval N. Shah, et al., "*A System and Method for Information Retrieval Regarding Services*", U.S. Appl. No. 09/175,516, filed Oct. 20, 1998, 65 Pages.

Dhaval N. Shah et al., "*System and Method for Resolving an Electronic Address*", U.S. Appl. No. 09/234,928, filed Jan. 22, 1999, 26 Pages.

Dhaval N. Shah, "*A System and Method for Selecting a Service with Dynamically Changing Information*", U.S. Appl. No. 09/287,213, filed Apr. 5, 1999, 58 Pages.

\* cited by examiner

PROXIMITY AS AN AID TO CACHING AND SECONDARY SERVING OF DATA

CROSS-REFERENCE TO RELATED APPLICATIONS

This application is a continuation of U.S. patent application Ser. No. 09/283,676 filed Apr. 1, 1999 now U.S. Pat. No. 6,832,253 in the name of Karl G. Auerbach, and entitled "PROXIMITY AS AN AID TO CACHING AND SECONDARY SERVING OF DATA," which is incorporated herein by reference in its entirety and for all purposes.

BACKGROUND OF THE INVENTION

The present invention relates to network technology. More specifically, the invention relates to managing the placement of network content such as video programming for efficient distribution.

The Internet and other large networks are being used to deliver large volumes of information such as multimedia content. The telephone companies, cable companies, and others are currently developing and installing infrastructure to provide video on demand (or "near video on demand"). These services provide video programming (e.g., movies, sporting events, television shows) stored on a "video server" to a "client" that wishes to view or otherwise have access to the content. The video server can store the content locally and service client requests by sending the content to the client over a network.

Many multimedia applications require that the network deliver very rapidly very large quantities of content. Video content is particularly challenging. Most applications require a display of at least 25 frames/second, with a resolution of 640×480 pixels/frame, and 24 bits/pixel for color. With a compression technique such as MPEG-2, the content must still be delivered at 4 to 6 Mbp/s. This rate must be sustained for the duration of a video program. When compressed in MPEG-2, a normal movie occupies roughly 2-4 GB of storage.

Networks called on to deliver high volume content such as video programming may have trouble meeting a client's demands. Network bottlenecks may arise due to topological constraints. For example, the network path chosen to transmit content from the server to the client may have numerous "hops." Each hop represents a router or other network entity receiving a packet. Such network entity must determine where to send that packet and the actually forward the packet to the next hop. Large hop counts indicate a potential problem because congestion often occurs in packet switched networks at the points where switching or routing occurs. Another bottleneck arises where a link between two routers or switches has limited bandwidth and yet carries heavy traffic, thereby slowing the transit of a packet between the two network devices. Yet another difficulty arises because some links introduce noise or otherwise degrade content quality. The effects of such problems include jitter (because the client receives packets at widely varying intervals), slow transmission (because corrupted packets are simply dropped in the case of many video or audio streams or may have to be resent), etc. Another consideration is that some links may be expensive to use—for example in Australia, one may have to pay by the byte or by the packet.

It may be that some enterprises position content servers at disperse geographic locations based upon a belief that clients are concentrated at or near those locations. For example, a large enterprise might place one video server in San Francisco, Calif. to handle its San Francisco Internet clients and another, similar, video server in San Jose, Calif. to handle its San Jose Internet clients. Unfortunately, this approach cannot rapidly address changes in client demand. For example, the demand for video service may double in San Francisco one month. Further, this approach does not account for the quality or cost of network transmissions, and does not adapt to changes in the network itself (e.g., changes in bandwidth, congestion, jitter, noise, topology, etc.). Generally the chance of significantly sub-optimal placement will increase when the degree of network interconnectivity and choice of path/route options is high What is needed, therefore, is a technique for placing content servers in a network in order to improve, and perhaps even to optimize, the delivery of content to client devices and end-users.

SUMMARY OF THE INVENTION

The present invention addresses this need by orchestrating the propagation or positioning of content based upon "proximity" between various nodes on a network. The nodes between which the content is propagated include, but are not limited to, content libraries, servers, and clients. In one case, the relative proximities of two content servers to a particular client or group of clients determines which of these servers serves client requests. In another case, the invention employs anticipatory loading of content from a library to a server based upon the server's proximity to a given client-base. Yet another application involves adding or removing server capacity to a network based upon proximity to clients. Still another application applies proximity affects to modify cache release algorithms that decide which pieces of content to remove from a cache (e.g., a server). Preferably, a network entity referred to herein as a "content control system" calculates proximity dynamically and automatically decides whether to move content based upon the proximity calculation.

The proximity of two nodes on a network may be a measure of the time, or more often the "cost," required to transmit a desired amount of content between the nodes and the quality of that content received by the receiving node. Various factors influence the proximity of two nodes. At a high level, "proximity" involves such factors as propagation time, the current saturation level of the paths over which the data might have to flow, their error rate, and even non-technical factors, such as whether taxes or data content restrictions may apply. More specific factors include, but are not limited to, the number of hops between the nodes, the bandwidth of the network path between the nodes, the measured congestion on the network path between the nodes, the noise on the path, the variation in the rate that individual packets of content are transmitted over the path, and the like. In a preferred embodiment, the proximity is determined from some combination of the above factors including the speed at which the content is transmitted and the desired quality of the received content. For some or all of the above-listed applications, it will be unnecessary to compute an "absolute" proximity. Often, the "relative" proximity of two nodes to a third node will be sufficient.

One aspect of the invention relates to methods of loading content to servers. Loading is done in anticipation of a need for the content by network clients. Such methods may be characterized by the following sequence: (a) determining the location of a client or group of clients that are likely to access the content; (b) determining a first proximity between the client or group of clients and a first server capable of storing and serving the content; (c) determining a second proximity between the client or group of clients and a second server capable of storing and serving the content; and (d) based upon the relative values of the first and second proximities, loading the content into one of the first and second servers. Additionally, the sequence may include (i) determining a first loading proximity between a source of the content and the first server and (ii) determining a second loading proximity between a source of the content and the second server. In this case, the first and second loading proximities are used together with the first and second proximities to determine which of the first and second servers should receive the content.

Generally, the content is loaded to the server that is most proximate to the client or group of clients. Preferably, a content control system performs (b), (c), and (d). It may also direct that loading the content to servers is performed automatically. Further, it may dynamically—at any suitable time—determine (or redetermine) the first and second proximities. Note that many types of content, such as multimedia content, are typically transmitted over the network in a compressed format.

Preferably, at least one of the first and second proximities is determined by a combination of the following factors: bandwidth, number of hops, congestion, noise and loss on a network segment, and charges incurred to send. In a specific embodiment, at least one of the first and second proximities is determined by a considering whether the server and the client or group of clients are on the same sub-network. Content is then loaded to the second server when the second server and the client or clients are on the same sub-network and the first server and the client or clients are not on the same sub-network.

In a specific embodiment, the method of loading content to a server in anticipation of need by network clients includes the following sequence: (a) determining the location of a client or group of clients that require access to the content; (b) identifying a first server currently storing the content and serving the client's requirements for access to the content; (c) identifying a second server that does not currently store said content but that has the capability of storing and serving the content; (d) determining a first proximity between the first server and the client or group of clients; (e) determining a second proximity between the second server and the client or group of clients; and (f) if the relative values of the first and second proximities meet a defined constraint (e.g., the second proximity is closer than the first), loading the content to the second server.

Another aspect of the invention relates to methods of selecting a server to fill a client request for content. Such methods may be characterized by the following sequence: (a) determining that one or more clients need or will need to receive the content; (b) determining a first proximity between the one or more clients and a first server capable of supplying the content; (c) determining a second proximity between the one or more clients and a second server capable of supplying the content; and (d) based upon the relative values of the first and second proximities, choosing one of the first and second servers to fill client requests for the content. Preferably, the content is media content such as video titles.

Yet another aspect of the invention relates to methods of releasing stored content items from a server to make room for new content items. Such methods may be characterized as including the following sequence: (a) identifying, on the server, a first stored content item and a second stored content item; (b) determining a first proximity between the server and a source of the first stored content item; (c) determining a second proximity between the server and a source of the second stored content item; and (d) releasing one of the first and second stored content items based upon the relative values of the first and second proximities. For many applications, at least one of the sources of the first and second stored content items will be a content library (e.g., a video content library). The first and second stored content items may be identified based upon a cache release protocol such as a "Least Recently Used" (LRU) algorithm.

Note that in any of the above method aspects of the invention, the first and second proximities need not be separately determined or obtained as precise values. Rather, they are often determined only as relative values for comparing the first and second proximities. Importantly, the invention does not require that a standard "unit" of proximity be used. Different applications need not be mapped onto a standard measure of proximity.

This invention also provides content control systems such as routers or other network devices that can propagating content on a network. Such systems may be characterized by the following features: (a) an interface to the network and (b) a processor and a memory coupled to said processor, the processor and memory being designed or configured to determine proximities of network nodes to one another and to propagate content to one of said nodes based upon a proximity determination. The controller may also include a mass storage device capable of storing content and a mass storage controller capable of controlling access to content stored in the mass storage device. Note that the content control system of may be provided on a PC or workstation.

The processor and memory of the content control system may be configured by an operating system and/or an application. In a specific embodiment, the content control system includes a video server running on the operating system. Preferably, the operating system and/or one or more applications provide one or more proximity determining tools.

These and other features and advantages of the present invention will be further described below with reference to the associated drawings.

DETAILED DESCRIPTION OF THE PREFERRED EMBODIMENTS

Figure 1:
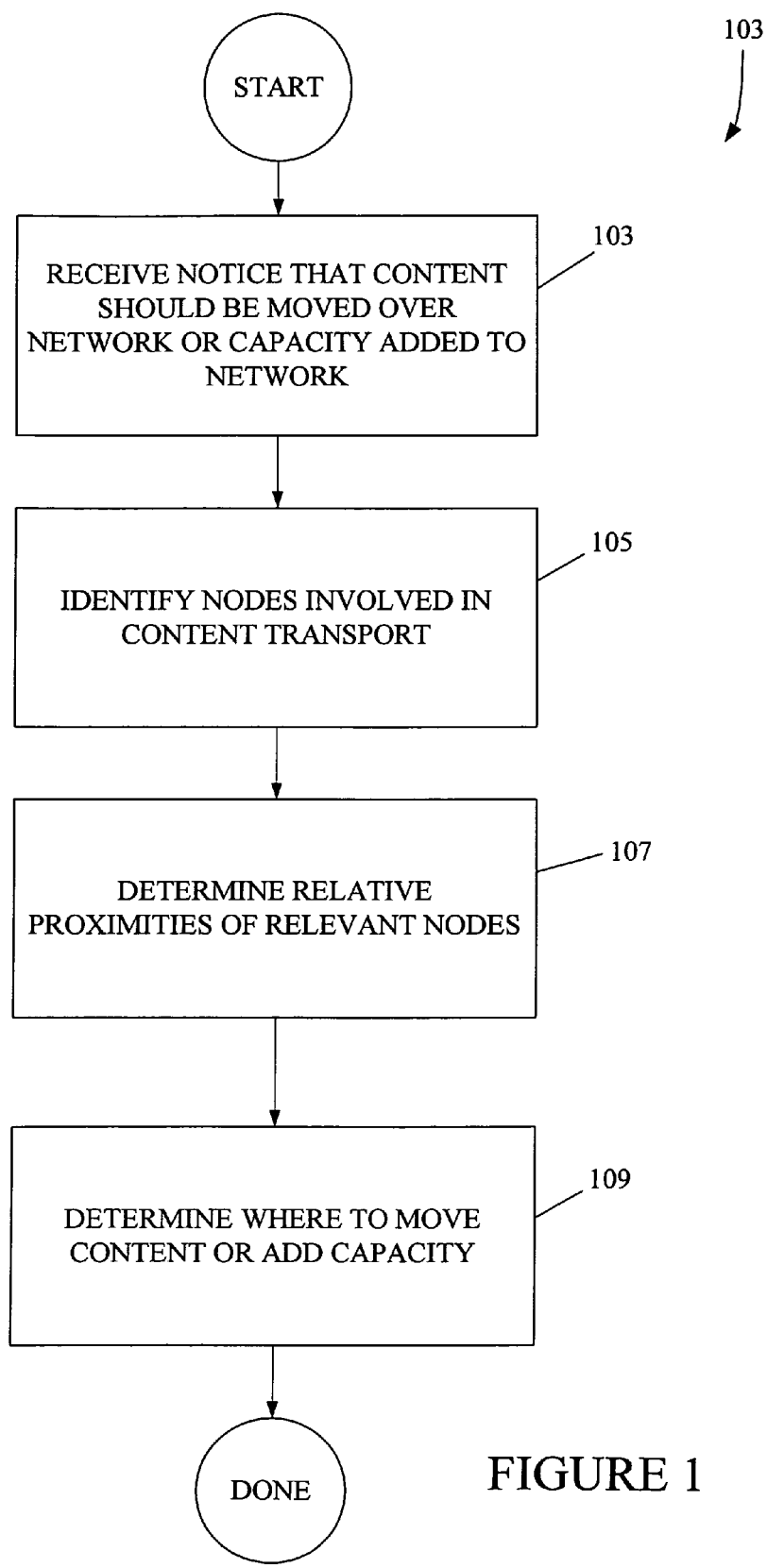
FIG. 1 is a process flow diagram depicting a very general procedure for implementing the content propagating methods of this invention.

This invention involves propagating content over a network based upon proximity. The timing and destinations of such transfers may be based upon the relative proximity of content libraries to content servers (e.g., video servers), content servers to clients (e.g., set top boxes), other content suppliers to content consumers, content servers to other content servers or to locations where a content server function could be instantiated. Typically, though not necessarily, content is moved to facilitate service to clients by one or more servers. Client/server environments, content servers, and networks are well documented in the technical, trade, and patent literature.

As used herein, the term "content" refers to any data that may be provided by a server to a client over a network in order to fill a client request. Of particular interest is content that is relatively voluminous and must be delivered rapidly. Examples include video titles such as movies, TV shows, music recordings, photographs, popular software distributions (like new versions of a major browsers) financial reports or books or other large documents (for example the Kenneth Starr report to Congress) which a large number of people would want to view within a relatively short period of time, etc.

Deciding where to locate such content may bring into play consideration of the associated applications (e.g., video applications). Most conventional routing decisions involve only lower level (e.g., network or transport level) considerations.

As a general principle, the larger a body of data is, the more likely it is to be damaged by errors in transit over a network. Also, larger bodies of data take more time to move. In general both the risk of damage and the time to move increase with the distance of the move. And that distance is not necessarily simply geographic or topological distance on a net, but the "proximity." For example, there might be two otherwise identical pathways, but one goes through a link that is known to be noisier than the other. The proximity calculation could thus conclude that the path containing the noisy link creates a worse proximity metric than the path without that link.

The invention requires that some entity or group of entities be configured or designed to determine proximity or relative proximity and decide where and when to propagate content. In the discussion herein, entities configured or designed for these functions are referred to as "content control systems." Various hardware entities may be configured or designed as content control systems. Examples of such entities include personal computers, workstations, network devices such as routers and switches, network computers, specially constructed machines, and the like. Of course, the content control systems and processes presented herein are not inherently related to any particular PC, workstation, router or other apparatus. In one specific embodiment, clients and/or servers may perform some or all functions of a content control system.

The discussion that follows focuses on applications of the invention that pertain to video content. This is done to provide a consistent example and generally facilitate understanding of the invention. Video applications are presented for illustration and not limitation. The invention extends to other applications where "large" volumes of content must be moved over a network. A "large" volume of content may be viewed as a chunk of content sufficiently large to likely cause the network transfer to be delayed or impeded. Generally, moving such content through the network involves a consumption of a significant amount of resources or generates significant costs.

FIG. 1 presents a generic process flow (101) for the content propagating methods of this invention. As illustrated, a content control system initially receives a trigger event (103) such as a new title becoming available at a video library or client requests going unfilled. Next, the content control system identifies the nodes that are actually, or potentially, involved in transferring the data (e.g., client(s), video server(s), a content library, and/or other nodes or network segments potentially having capacity). This procedure is represented by block 105. Thereafter, the content control system determines the relative network costs (proximities) associated with transmitting the content between appropriate nodes that were previously identified (107). Finally, the content control system decides where and when to move content based upon the costs it previously determined (109).

Figure 2A:
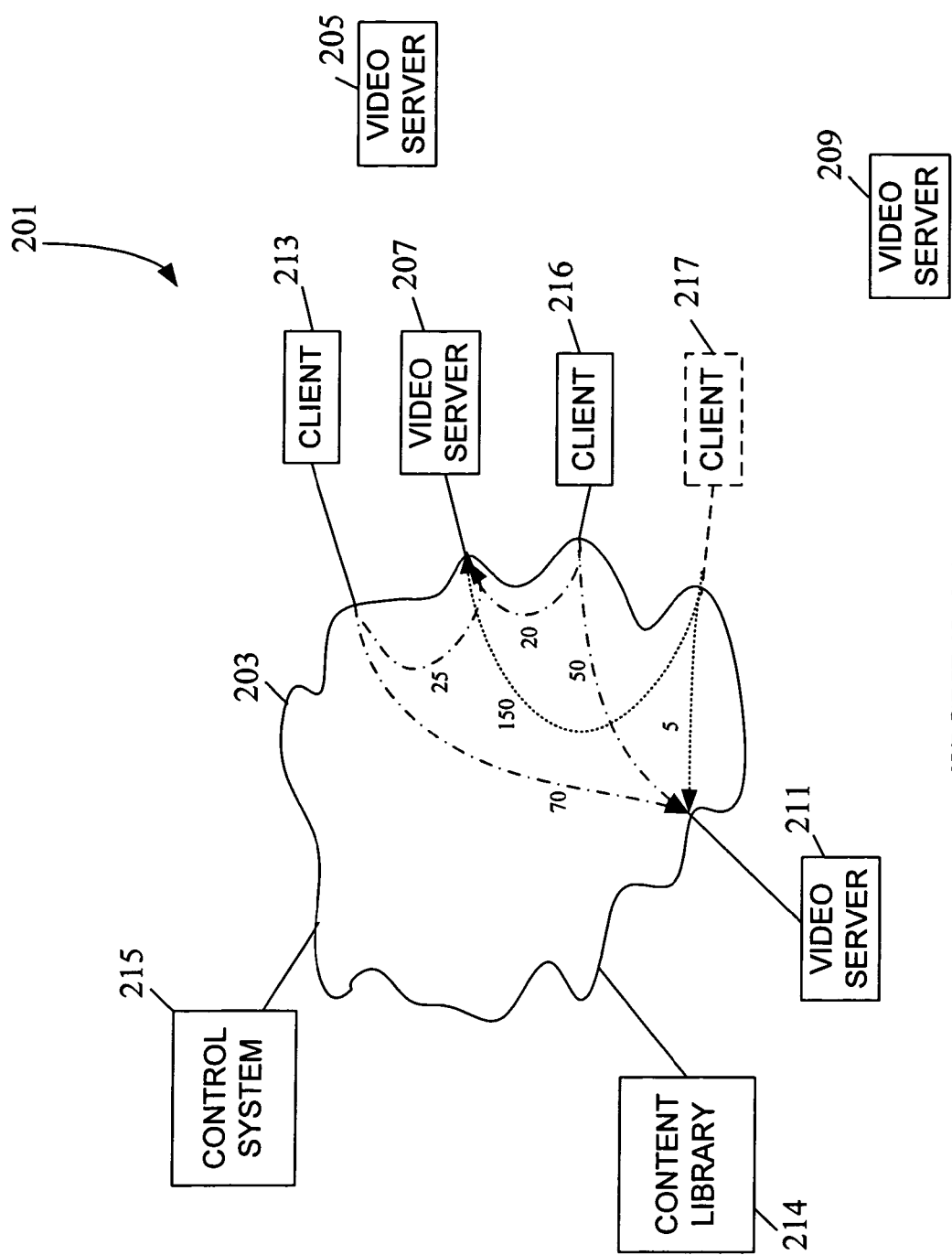
FIG. 2A is a network diagram illustrating how video servers may be chosen for anticipatory loading and for serving client requests.

FIG. 2A illustrates a network 201 in which multiple clients, video servers, and other entities communicate over the Internet or a wide area network 203. Video servers 205, 207, 209, and 211 all provide video content desired by certain clients such as a client 213 and a client 216. In addition, network 201 includes a content library 214 that stores various video titles which may be provided to one or more of the video servers. If a new video title becomes available on content library 214 and a particular video server determines that it will likely need that title to fill client request, that title may be loaded from content library 214 to the appropriate video server.

Often a given client places a request for video content. The client does not care which video server provides the content; it simply wants high quality rapid service. One aspect of this invention provides a mechanism by which the appropriate video server for serving a client request is identified and then fills the request. The choice of a particular video server to fill requests is based upon the proximity between the client and various potential video servers. The logic that makes this decision is represented by a content control system block 215 connected to network 203. Note that content control system 215 may be distributed over multiple entities on the network and may reside, partially or completely, on a content library, a video server, or even a client.

Suppose that client 213 places a request for a video title available on any one of the video servers in FIG. 2A. The client's request should be filled by the video server most "proximate" to client 213. Content control system 215 determines proximity as described elsewhere herein. In the simplified representation of FIG. 2A, proximity is given integer numbers. Large numeric values of proximity correspond to "distant" entities, between which the "cost" of transferring video content is relatively great. As illustrated, client 213 has a proximity of "70" to video server 211 and a proximity of "25" to video server 207. As video server 207 is more proximate to client 213, content control system 215 determines that video server 207 should fill the client's request.

Now, suppose that client 216 also requests a video content title available on servers 207 and 211. Client 216 has a proximity of "20" to server 207 and a proximity of "50" to server 211. Again, content control system 215 determines that the request of client 216 should be handled by video server 207.

Another client 217 may later attach to the network. The relative proximities that it has to video servers 211 and 207 may dictate that video server 211 handle its requests.

The concept of proximity is also useful in determining where and when to provide "anticipatory loading" of video content from library 214 to the video servers. If loading content onto video servers is a costly operation (because it consumes significant server and library bandwidth and the content occupies expensive server storage space, for example), the content control system should be very selective in determining which servers should receive the content. Suppose that video servers 207 and 211 are both potential candidates for anticipatory loading of a new video title. In accordance with this invention, content control system 215 might determine which client or clients are most likely to request such title. If it appears that either client 213 or client 216, or both will request the title, proximity considerations dictate that the content be loaded to server 207. However, if client 217 may also desire access to the new title, it may make more sense to load the title onto video server 211, rather than server 207. Note that the proximity considerations may be determined based upon a group of likely clients, rather than simply on a single client.

Figure 2B:
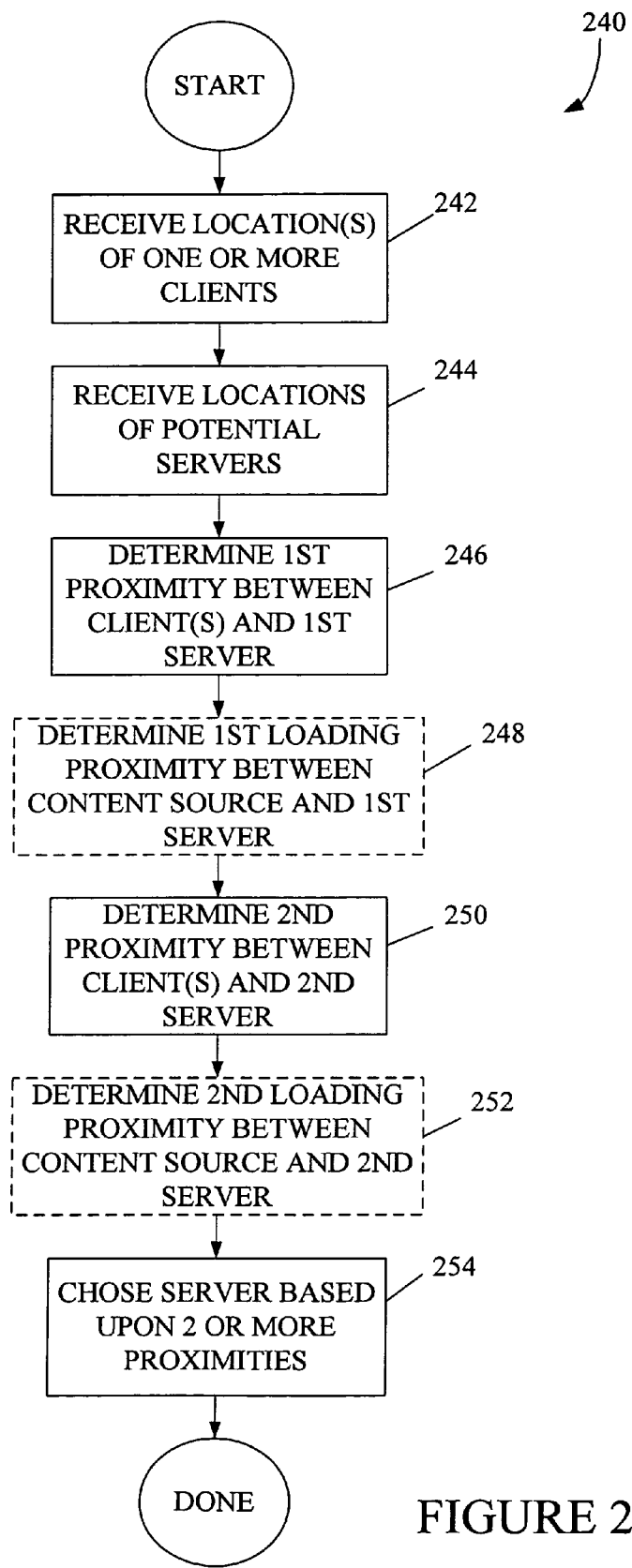
FIG. 2B is a process flow diagram depicting one general procedure, in accordance with this invention, for identifying one server for handling clients (or for anticipatory loading).

FIG. 2B presents a process flow diagram for a general procedure that may be employed to identify a particular server for either anticipatory loading or providing content to clients. Process 240 begins at 242 with the content control system receiving or otherwise identifying the location of one or more clients that will require the content. This may require identifying locations where clients are expected to subscribe to a video service for example. In one case, the potential clients may be part of a single cable plant that is to receive a new digital video service. Next, at 244, the content control system receives or otherwise determines the locations of two or more servers that can potentially fill the needs of the clients referred to at 242.

With the locations of the various network entities now in hand, the content control system must determine relevant proximities. At 246, it determines a first proximity between the one or more clients and a first server. The first proximity may be determined by any suitable technique as outlined below. In the case of an anticipatory loading, the control system may also determine a "first loading proximity" between the first server and the source of the content of interest. Such source may be a video library, for example. This optional procedure is depicted as block 248 in FIG. 2B.

The content control system now has a complete picture of the cost of using the first server to service the one or more clients. It must compare this cost against that associated with using one or more other potential servers (as identified at 244). For simplicity, process 240 assumes that there are only two servers under consideration. The process of this invention extends to any number of potential servers.

As illustrated, the content control system next determines, at 250, a "second proximity" between the one or more clients and a second server. Thereafter, at 252, it optionally determines a "second loading proximity" between an appropriate source of the content and the second server. Note that each "proximity" used in this process may be generated according to the procedures described herein.

At this point, the content control system has all the information it needs to make a decision regarding the use of the first or second server. At 254, it chooses one server for loading or serving content based upon two or more of the proximities determined above. The process is then complete. Note that the content controller may thereafter initiate serving of the content or moving the content.

In the above examples, the "proximity" of two nodes was given an integer number. Typically, there will be no absolute scale of proximities. A relative measure of proximity is usually sufficient because most applications will only care about comparing proximity values, not in determining precise degrees of difference in proximity. Further, proximity may be a fuzzy computation with a somewhat low degree of precision.

The proximity of two nodes on a network is based upon a "network distance" between those nodes. Network distance is a dynamic measure of the "effectiveness" of a possible pathway for a particular data transfer. By way of analogy, consider a person who drives a personal automobile through a typical urban rush hour. That person selects the most effective pathway from home to work by considering not merely the geographically shortest path, but the current traffic conditions. In many cases that person may chose a geographically longer path in order to avoid a traffic jam. Further, if the person is driving a truck, the path may be limited to routes that allow trucks.

Network distance is used to make a relative comparison between different paths that might be used to move data from one point in the network to another. In general, network distance is a measure of the effort it takes a defined amount of content to move from a first node to a second node. It typically also includes some consideration of the "quality" and/or "cost" of that transfer. Examples of parameters that contribute to network distance include the number of hops on a path, the bandwidth of the narrowest portion of the path, traffic on one or more segments of the path, noise, loss, cost (based on the biggest burst of content, for example), variation in delay (jitter), and the like. Each of these may be contained in the notion of "proximity".

At different times, as other traffic flows on the network, what is closely proximate at one time may be distant at another. Network traffic and noise over a given path may increase and decrease over the course of a day or week. Further, a given path may become unavailable due to equipment failure, maintenance, etc. These concepts are familiar to most people who commute to work via automobile.

One specific procedure for determining proximity involves comparing the sub-networks of two nodes. In an IP network, the sub-network identity may be obtained from the prefix on the IP addresses of the two nodes. If the nodes are on the same sub-network, they are presumed to be in very close proximity. Typically, though not necessarily, a high bandwidth, low-delay connection exists between nodes on the same sub-network. If the nodes are not on the same sub-network, then they are not considered to be in such close proximity.

While frequently valid, this is a somewhat rough estimation of network distance. Two nodes on the same sub-network are not guaranteed to have a high bandwidth, low-delay connection. Further, in many cases, no two nodes under consideration reside on the same sub-network. To further specify the proximity between two nodes, the time required for a packet to make a round trip between the two nodes may be used. A "ping" message may be employed for this purpose.

Most broadly, proximity is simply a relative measure of how well a proposed network path will serve a specific purpose. The notion of "specific purpose" is important because the way in which one evaluates the elements composing proximity will vary depending on what one is trying to do. If one is moving data which does not need to be delivered with a precise metronomed inter-block inter-arrival time, then one can reduce the weight one gives to factors in a network path which pertain to causes of inter-arrival time variation. Thus, in this case, one could tend to put a lower weight on the number of hops a path may contain. Router hops tend to exacerbate inter-arrival jitter, so if the application is not too sensitive to inter-arrival jitter, the content control system need not care as much about the number of hops when computing proximity.

In a preferred embodiment, the proximity calculation is made by software considering the various elements composing the path being evaluated. It may look at each element, whether that element be a communications link (like a fibre optic cable or a shared Ethernet), or a switching device (such as a router or switch), and, using known characteristics about such things (such as knowing that Ethernets are shared and can not make guarantees, or that a certain kind of telephone company circuit has a certain fixed upper bound on the bits it can carry per second) computing a "proximity contribution" based on that characteristic in the context of the particular traffic to be carried. For example, if the intent is to evaluate a path to carry a 600 megabyte video file, a relatively high (bad) proximity contribution value might be attributed to a T-1 circuit that is known to be carrying many other flows of traffic. The proximity calculation may be concluded by summing all of the proximity contributions into a grand proximity total. Various "proximity tools" or methods may be employed to measure absolute or relative network proximity. Some specific tools/methods that may be employed in determining proximity follow.

Ping Facilities. Generally, a ping facility determines whether a destination node is alive and, if so, how long it takes a message to make a round trip the route between a source node and the destination node. Ping messages come in many flavors, thus allowing the content control system to tune its measure of proximity to the content under consideration. For example, a ping message may be sent as a generic UDP packet, a generic TCP packet, an ICMP packet, etc. Network routers and links may handle each of these packet types differently. By matching the ping message to the content type, relevant transit time information can be extracted. Further, ping messages can have many sizes. Because packet size also affects network effectiveness, the content control system may chose a ping packet size corresponding to an average or maximum packet size associated with the content.

Other variations on the basic "ping" facility may be employed to extract desired proximity information. For example, the ping message may set the "Type-of-Service" or "Quality of Service" bits in the IP header and IP options. Ping tests should be used carefully across the Internet and complex corporate nets because the path may not be symmetrical, i.e. the outbound and inbound packets may take vastly different routes. (This is why "traceroute" or other actual route/path determining mechanisms are useful additions to basic "ping" information.)

Routing Protocols. Current network technology provides a great deal of network topology and distance information in the form of routing protocols. In the present invention, the content management system may make use of such information.

Conventionally, routing protocols determine, at each hop, where to send a packet along its path from a source node to a destination node. Routing protocols are implemented by routers that serve as relays on a pathway. The router receives a packet, determines the destination address, consults the routing protocol, and determines where to next send the packet on its way to the final destination. Routing protocols are focused on moving individual packets, rather than blocks of content. Nevertheless, some routing protocols determine parameters that may be used to contribute to the notion of proximity.

Some older routing protocols only know the next hop and have only a small bit of knowledge about the length of the path beyond that next hop. Many current routing protocols have some notion of "metric" that involves an evaluation of the distance, cost, or effectiveness of the path that would be followed if a packet is forwarded to a give next hop. For example, some routing protocols determine the "shortest path" between a pair of routers. The shortest path may, most crudely, determine the geographic distance in miles or kilometers. The shortest path may alternatively be based on the number of hops on various pathways between two routers. Even more sophisticated routing protocols also consider the mean queuing and transmission delays for some standard test packet based on periodic test runs. With this approach, the shortest path is the fastest path, regardless of geography or hop count. Network links may be labeled based on distance, bandwidth, average traffic, communication cost, mean queue length, measured delay, etc. These parameters can be weighted and combined to achieve a numerical value of a link's "proximity." The overall proximity of two nodes may be obtained from the proximities of individual links making up the path.

Note that there are routing protocols, OSPF among them, which can apply arbitrary weighting metrics to links. While a proximity metric of this invention may also do this, a proximity metric need not include simply the links themselves, but could also include the costs of the inter-link switching devices, their noise rates, their resiliency to streams of back-to-back packets (i.e. their buffering), as well as predictive elements (for example, knowledge that a particular link is used as a backup to some critical function and, despite its apparent light load, is subject to preemption).

Routing tables maintained by network devices contain entries for destination subnets. Each entry may contain two parts: the preferred outgoing line to use for that destination, and an estimate of the time or distance to that destination. Such information can be used with the present invention to estimate, in conjunction with other parameters, proximity. Note that routing tables often contain much additional information, the two elements given are but two of those kinds of information, but they are two elements found in almost all such tables.

Traceroute: Another way of determining proximity is via a standard traceroute. This shows the actual sequence of routers that a packet passes through. A traceroute packet expires after a defined number of hops (e.g., 10). The router that gets the packet on its final hop sends a message notifying the source of the path of that the packet took.

In the following example of a traceroute notice that it shows each hop and some round trip times to that particular hop. Note that there are typically three probes at each TTL value. Hence the three round trip times shown below.

traceroute to cio-sys.cisco.com (192.31.7.130), 30 hops max, 40 byte packets 1 rtr-1a-et1.cavebear.com (192.203.17.65) 10 ms 4 ms 4 ms
  2 165.227.245.1 (165.227.245.1) 8 ms 12 ms 6 ms
  3 scruz-a2.scruz.net (165.227.1.72) 31 ms 29 ms 28 ms
  4 165.227.1.254 (165.227.1.254) 32 ms 61 ms 106 ms
  5 165.227.1.154 (165.227.1.154) 118 ms 59 ms 85 ms
  6 208.243.206.193 (208.243.206.193) 105 ms 79 ms 111 ms
  7 157.130.195.145 (157.130.195.145) 110 ms 56 ms 38 ms
  8 146.188.147.214 (146.188.147.214) 43 ms 38 ms 36 ms
  9 188.ATM10-0-0.BRLPAO1.ALTER.NET (146.188.148.101) 41 ms 42 ms 46 ms
  10 137.39.250.246 (137.39.250.246) 56 ms 39 ms 40 ms
  11 p3-0.paloalto-nbr1.bbnplanet.net (4.0.1.49) 38 ms 40 ms 44 ms
  12 p1-0.paloalto-nbr2.bbnplanet.net (4.0.5.66) 67 ms 41 ms 46 ms 13 p0-0-0.paloalto-cr18.bbnplanet.net (4.0.3.86) 43 ms 43 ms 67 ms
14 h1-0.cisco.bbnplanet.net (131.119.26.10) 59 ms 53 ms 61 ms
15 sty.cisco.com (192.31.7.39) 48 ms 86 ms 40 ms
16 cio-sys.cisco.com (192.31.7.130) 50 ms*43 ms A related tool is the "pathchar" tool developed by Van Jacobson. This tool detects the number of router hops and the bandwidth of the links on path. It operates somewhat like traceroute, except that for each hop it runs a spectrum of packets, of various sizes and measures the round trip times. As it does this, starting with the closest hop and then working outward towards the destination, it is able to derive the apparent speed of each link. The following is an example of a pathchar output:

pathchar to cio-sys.cisco.com (192.31.7.130)
   doing 32 probes at each of 64 to 1500 by 32
   0 localhost
   |9.0 Mb/s, 1.09 ms (3.51 ms)
   1 rtr-1a-et1.cavebear.com (192.203.17.65)
   |10 Mb/s, 0.97 ms (6.66 ms)
   2 scruz-e2-ethx.scruz.net (165.227.245.1)
   |57.8 Kb/s, 4.72 ms (224 ms)
   3 scruz-a2.scruz.net (165.227.1.72)
   |5.4 Mb/s, 0.95 ms (228 ms)
   4 eth0-0.pacific.scz.tycho.net (165.227.1.254)
   |1.1 Mb/s, 1.51 ms (242 ms)
   5 165.227.1.154 (165.227.1.154)
   |162 Mb/s, 1.38 ms (245 ms), +q 5.18 ms (106 KB)*4
   6 t3-0-1-0.border1.pao.tycho.net (208.243.206.193)
   |3.1 Mb/s, 251 us (250 ms), +q 7.86 ms (3.01 KB)*2
   7           907.Hssi12-0.GW1.PAO1.ALTER.NET (157.130.195.145)
   |88 Mb/s, −419 us (249 ms), +q 6.32 ms (69.8 KB)*3
   8 146.188.147.214 (146.188.147.214)
   |?? b/s, 583 us (250 ms), 11% dropped
   9 rtr-1a-et1.cavebear.com (192.203.17.65)

Topology Discovery. There are techniques, often used in network management platforms, to determine network topology and population. Generally, topology discovery determines which nodes are connected to which other nodes by links. In other words, it simply determines the "topology" of a network. Topology discovery techniques may employ combinations of SNMP queries, ICMP echo requests, "pings," ICMP subnet mask requests, and traceroutes. The invention may make use of information obtained by such techniques in the content management system.

Topology discovery may be employed to determine the number of hops. Also, when SNMP is used, one can obtain the nominal data speed of interfaces, i.e. one can learn that a particular router is attached to a 100 megabit Ethernet or a 2048 Kbit E-1 circuit. Also, via network management one can obtain measures of the error rates being encountered on a link and of the other traffic that may also be sharing the link. This allows one to determining the actual value of a link as a carrier for additional data flows. That's much like listening to the radio to determine which freeways are congested or whether a parade is scheduled down Main Street when one is planning a trip.

Pilot Tone. The present invention allows servers (and sometimes clients) to emit a "pilot" signal. This can be formed of small UDP packets, multicast or unicast out with a well-known initial IP TTL (or with the initial value in the packet's data field), for example. Each IP packet contains an 8-bit field called a TTL. Each time the packet passes through an IP router, the router decrements the TTL. If the TTL reaches zero, the to router discards it rather than forwards it. In this way should there be a routing loop, stale packets will fade away after some number of cycles through the loop.

In a preferred embodiment, pilot signals can be sent infrequently, perhaps every 30 seconds or so. The receiver considers the TTL field when received to generally determine distance in terms of router hops by subtracting the received TTL value from the initial TTL value.

In one possible implementation, the server or client emits pilot signals in a predictable pattern according to an accurate clock. This means that a receiver can know when to expect packets. The receiver compares the receive time with the expected arrival time and not only computes an actual number representing a measure of network transit time, but also notes the number of losses and the variations between expected and actual times, computes some notion of the quality, loss rate, and even the congestion of the path the packets are taking.

This approach may be further understood as follows. In a network when one knows that a source is emitting a signal at very precise intervals, a receiver who perceives these signals arriving with the same interval can learn that the path is relatively stable; i.e., that its characteristics are not changing. On the other hand, if an intermediate link is subject to bursty traffic loads, noise bursts, or routing loops, then the signal will arrive with an amount of variability.

Remote MONitoring ("RMON"). The present invention may employ RMON devices to evaluate a network link and obtain link saturation information, for example. RMON is described in RFC 1757 Remote Network Monitoring Management Information Base. S. Waldbusser, February 1995, which is incorporated herein by reference for all purposes. Remote Monitoring is distinguished from the other techniques in that it involves watching traffic on a link or node, as opposed to focusing on a single packet. In essence, it provides a direct measure of the traffic on a portion of a network. Obviously, this value can vary with time. When combined with knowledge of a network segment's bandwidth, it can be a measure of congestion on the network. The content management system may use RMON information to build proximity metrics, for example.

Like network management, RMON acts as a "man on the spot" to measure what is going on network links (usually sharable links such as Ethernets). One can remotely "program" an RMON probe to measure certain characteristics of the remote network. This then, can be a source for knowledge about the quality and available bandwidth of a potential element of a path. When a path traverses "good" elements it would most likely have better "proximity" than a path with the same number of hops that traverses some "bad" elements.

Figure 3A:
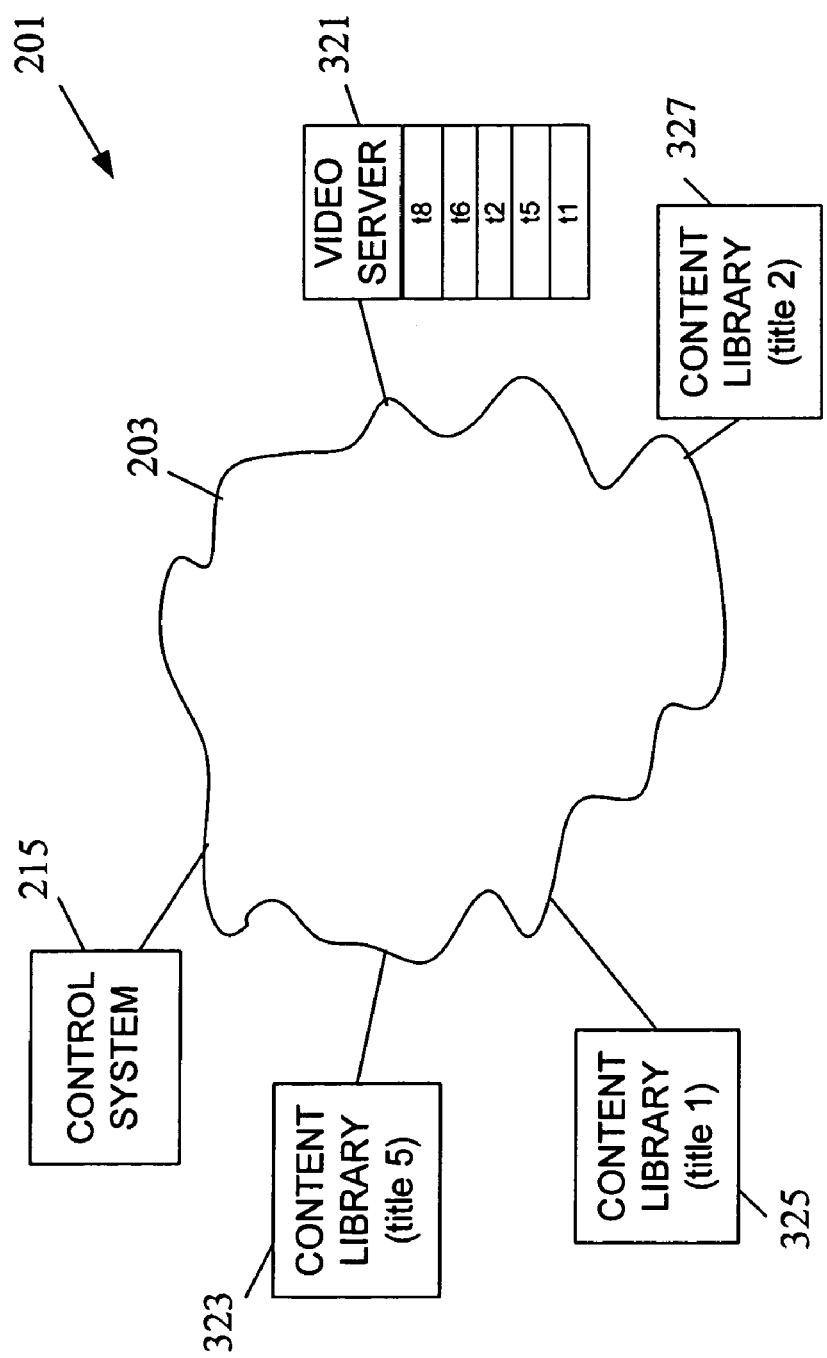
FIG. 3A is a network diagram illustrating a method for determining how content may be released from a video server.

In FIG. 2A, the invention was illustrated as it pertains to anticipatory loading and determining which available server will handle a client's request. FIGS. 3 and 4 present two other applications of the present invention. FIG. 3A illustrates how the invention may make decisions to release stored content items on a video server 321 in order to make room for new titles. Note that most conventional "cache release algorithms" do not consider how easy it is to reacquire the content that is being released. It may be the case that what was thought to be stale was really of interest to somebody and needs to be reacquired. In this invention, the system "hedge the bet" by releasing the content that is easiest to reacquire.

As illustrated in FIG. 3A, server 321 includes the following titles: T1, T2, T5, T6, and T8. In this example, the least recently used title is T1. Following T1 in succession of "recentness" are titles T5, T2, T6, and T8. Using a conventional "least recently used" algorithm (LRU), T1 would be released first, T5 would be released second, T2 would be released third, etc. However this approach is not always the most efficient approach if reloading titles onto server 321 is a particularly costly operation. The cost of the loading operation can be gauged by the proximity of server 321 to various content libraries; such as content libraries 323, 325, and 327 illustrated in this figure. Here, content library 325 stores title 1 and has a proximity of "60" to video server 321. Content library 323 provides title 5 and has a proximity of "50" to server 321. Finally, content library 327 houses title 2 and has a proximity of "30" to server 321. These proximities may be determined by content control system 215, for example. The "costliest" loading to server 321 is the loading of title 1 from library 325. Thus, while an LRU algorithm might dictate that T1 be the next content item to be released, proximity considerations might suggest otherwise. In this example, content control system 215 may determine that it makes sense to now release title 2 because it is the least costly title to reload.

Figure 3B:
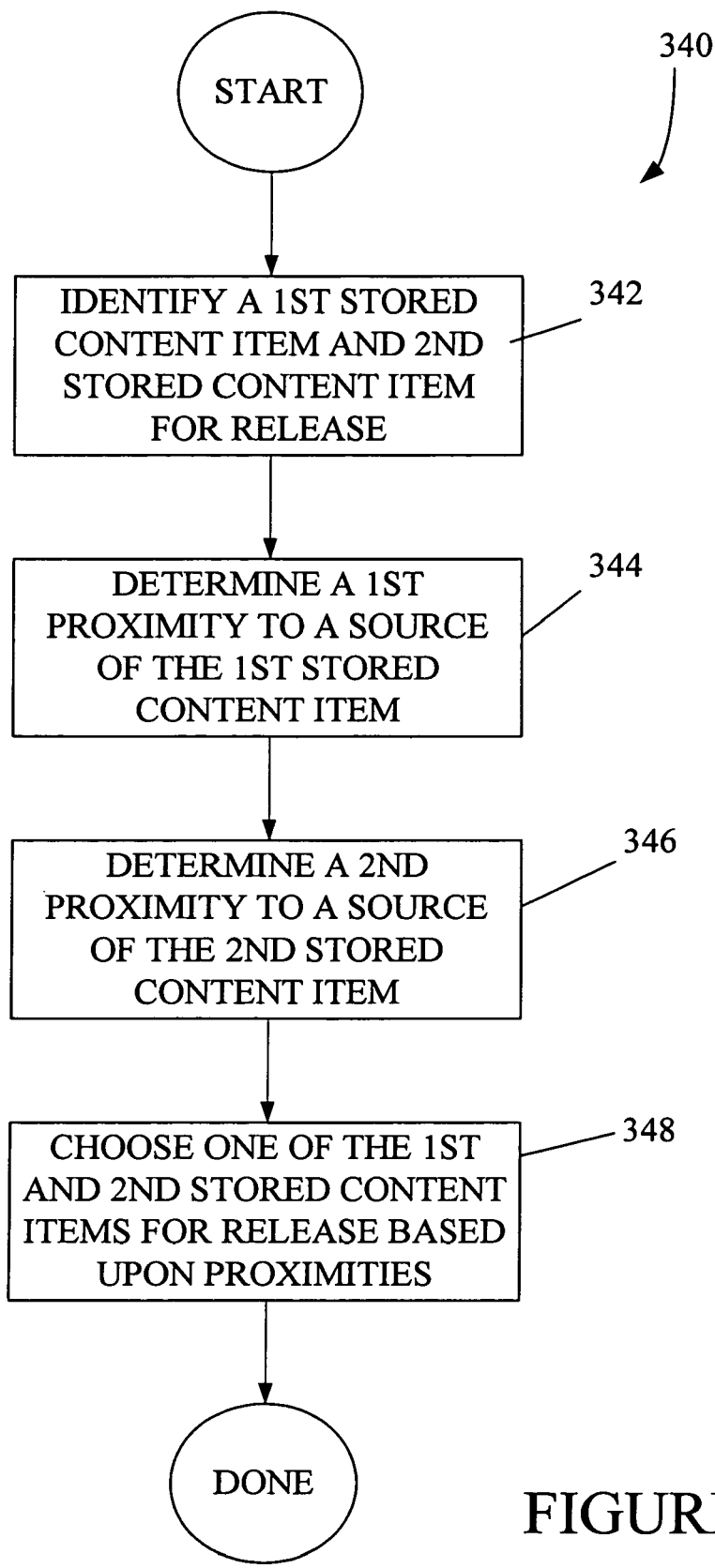
FIG. 3B is a process flow diagram depicting one general procedure, in accordance with this invention, for choosing a temporarily stored content item for release from a server.
Figure 4:
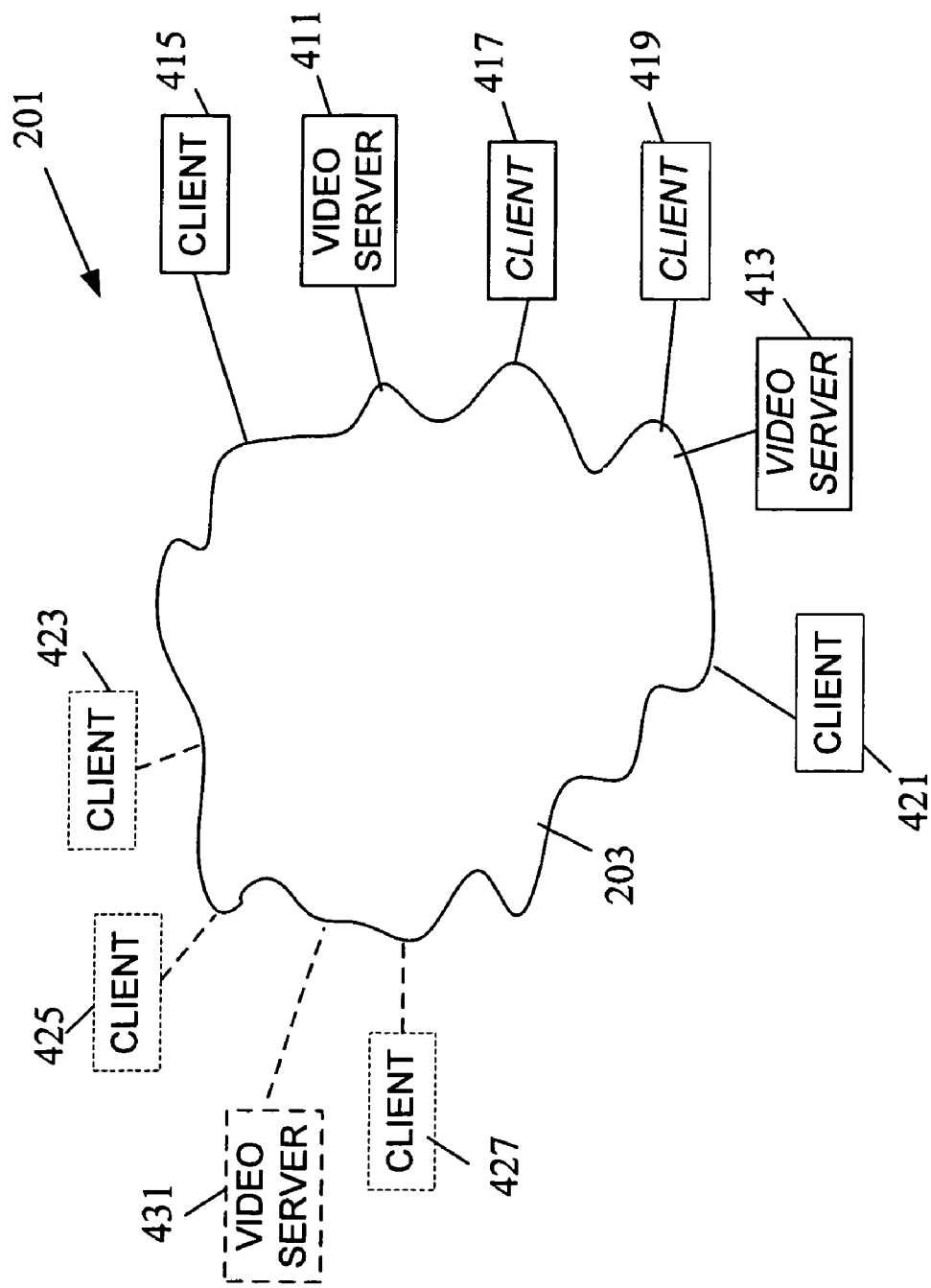
FIG. 4 is a network diagram illustrating a method for determining where to add server capacity and where to remove server capacity in accordance with one embodiment of this invention.

FIG. 3B presents a process flow 340 that may be employed to release content temporarily stored on a server or other network entity. The process begins at 342, with a content control system receiving or otherwise identifying a first stored content item and a second stored content item for release from a particular server or library. Next, at 344, the content control system determines a first proximity between the server and a source of the first stored content item. Then, at 346, it determines a second proximity between the server and a source of the second stored content item.

At this point, the content control system can determine the relative values of the first and second proximities. From this, it determines, at 348, which one of the first and second stored items to release. Note that this process will sometimes decide to release an item other than the item identified by a conventional cache release protocol. Note also that process 340 may consider many additional stored items that are eligible for release. For simplicity, the flow chart considers only two stored content items.

FIG. 4 illustrates how this invention may determine where video servers should be installed on a network 203 to address capacity issues. Initially, video servers 411 and 413 service requests from clients 415, 417, 419, and 421. These video servers are reasonably proximate to the clients they serve. Therefore, rapid high quality service is available. However, if new clients 423, 425, and 427 attach to network 203 at a location very remote from video servers 411 and 413, these new clients will not be well served by the existing video servers. The proximity considerations of this invention may suggest that a new video server 431 should be installed to serve the requests of new clients 423, 425, and 427. Note that the installation may simply involve converting an existing, but underutilized, device on the network such as a router or PC that can run a video server application. Alternatively, if clients 417 and 419 leave network 203 or discontinue their subscriptions to a video service, the video server 413 may represent significant excess capacity. If the overhead to maintain server 413 is great, the proximity considerations of this invention may suggest that server 413 be retired.

In a specific embodiment, the content control systems of this invention are implemented on a network device designed to handle network traffic. In a further specific embodiment, the video servers and the content libraries are also preferable implemented on network devices.

Generally, a content propagation method of this invention may be implemented on software and/or hardware. For example, it can be implemented in an operating system kernel, in a separate user process, in a library package bound into network applications, on a specially constructed machine, or on a network interface card. In a preferred embodiment of this invention, content propagation logic is implemented in software such as an operating system or in an application running on an operating system.

A software or software/hardware hybrid content propagation system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the content propagation systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines is described with reference to FIG. 5 below. In an alternative embodiment, the content propagation system may be implemented on a general-purpose network host machine such as a personal computer or workstation. Further, the invention may be at least partially implemented on a card (e.g., an interface card) for a network device or a general-purpose computing device.

Figure 5:
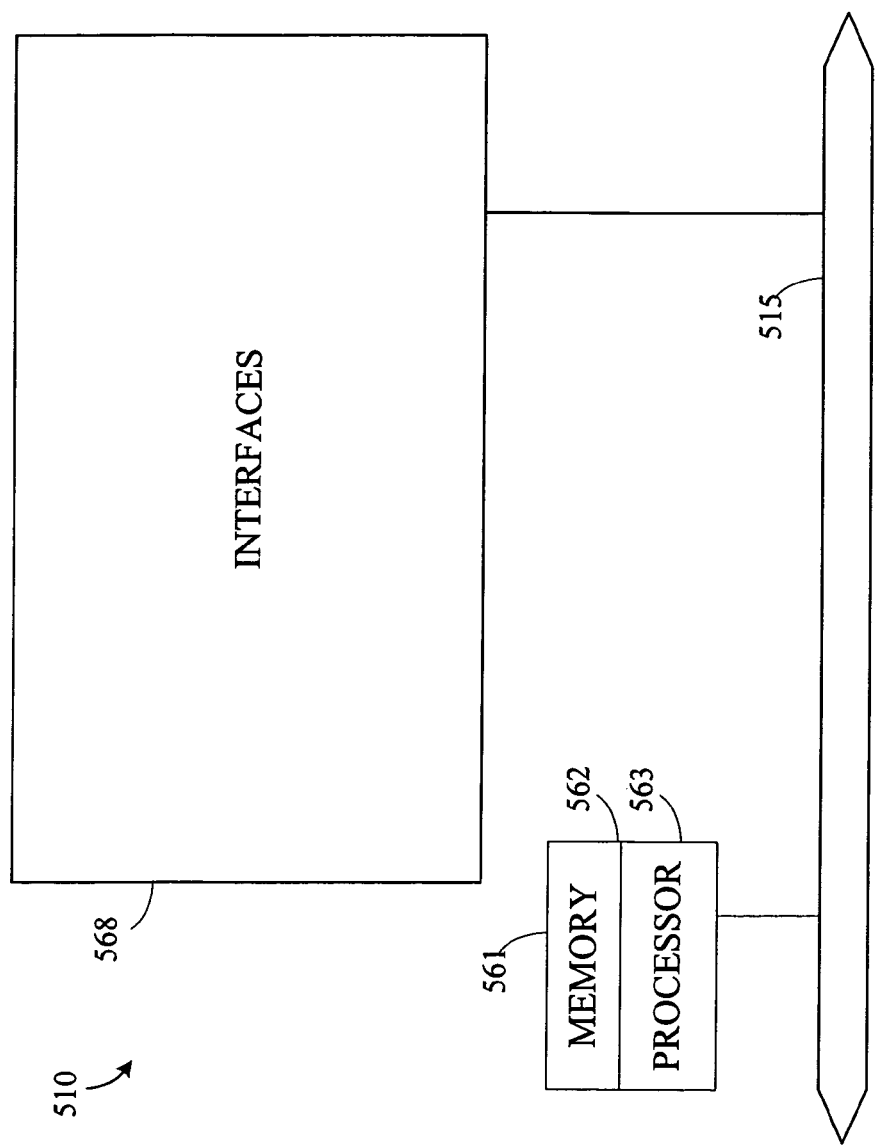
FIG. 5 is a block diagram of a router that may be used in this invention to implement a proximity-based content control system and/or a content server.

Referring now to FIG. 5, a router 510 suitable for implementing the present invention includes a master central processing unit (CPU) 562, interfaces 568, and a bus 515 (e.g., a PCI bus). When acting under the control of appropriate software or firmware, the CPU 562 is responsible for such router tasks as routing table computations and network management. It may also be responsible for measuring, calculating or approximating network proximity and controlling content propagation, etc. It preferably accomplishes all these functions under the control of software including an operating system (e.g., the Internetwork Operating System (IOS®) of Cisco Systems, Inc.) and any appropriate applications software. CPU 562 may include one or more processors 563 such as a processor from the Motorola family of microprocessors or the MIPS family of microprocessors. In an alternative embodiment, processor 563 is specially designed hardware for controlling the operations of router 510. In a preferred embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the router 510. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one preferred router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 561) configured to store program instructions for the general-purpose network operations and content propagation operations described herein. The program instructions may control the operation of an operating system and/or one or more applications, for example. The memory or memories may also be configured to store relevant state information, data structures, etc., as well as the proximity information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 6:
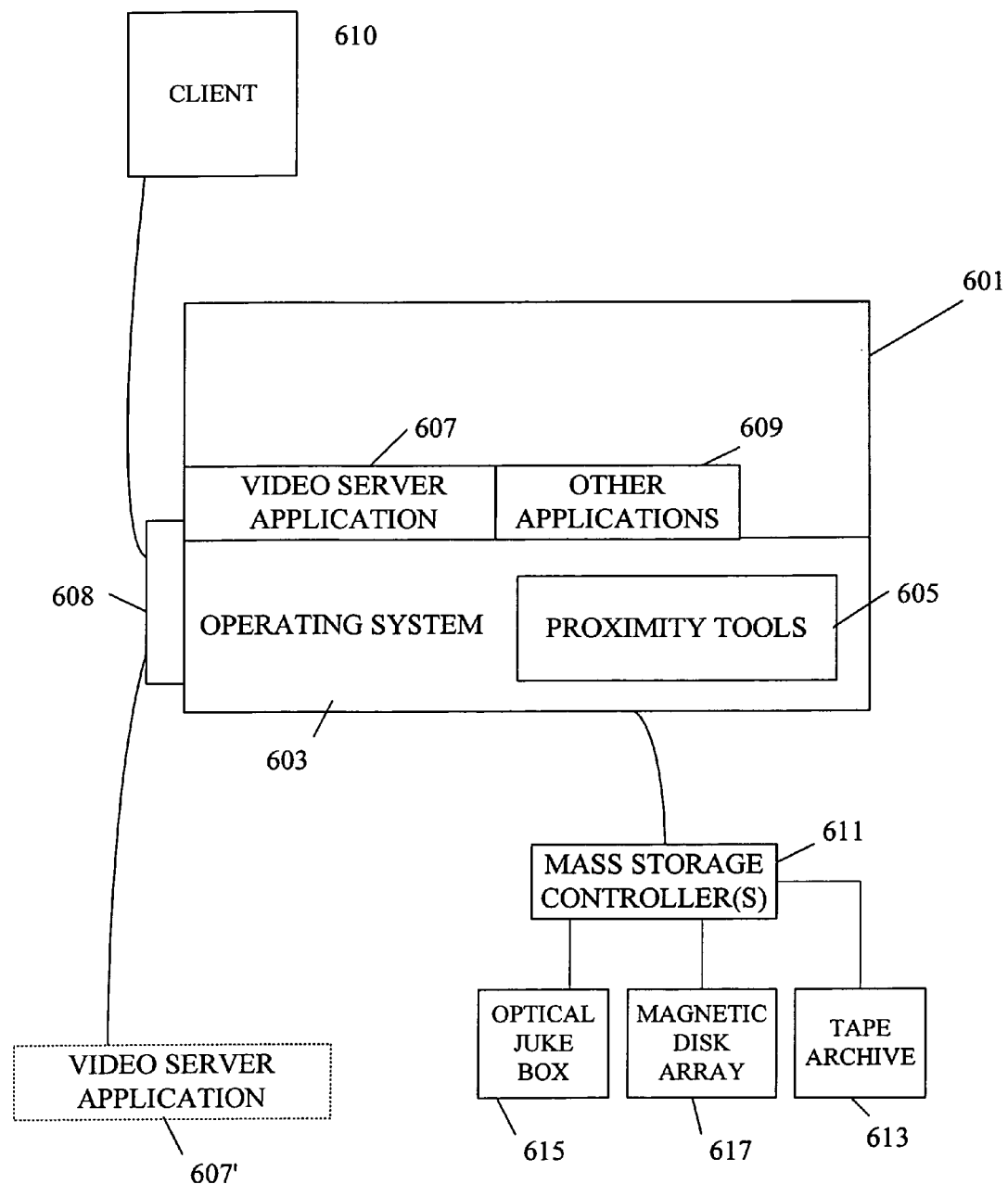
FIG. 6 is a block diagram of a network device that operates as a content server and a content control system in accordance with one embodiment of this invention.

In one specific embodiment, a content control system of this invention is implemented as part of an operating system that runs on a router or other network entity. FIG. 6 depicts a network device 601 such as a router or switch (or even a PC or workstation) running a network operating system 603 such as the Cisco IOS®. Network operating system 603 includes a suite of proximity tools 605 that can calculate network proximity. Tools 605 may have the ability to calculate absolute proximities between two arbitrary nodes on a network and/or relative proximities of two or more arbitrary nodes to another node. Tools 605 may also be capable of determining whether content should be propagated to a particular network node based upon its proximity to one or more other network nodes. Still further, tools 605 may generate the commands necessary to initiate the content transfer that it decided on.

A video server application 607 runs on network operating system 603. One or more other applications 609 may also run on network operating system 603. Such other applications may include a television application and a telephony application, for example. Video server application 607 makes video content available to clients on the network. It manages video content by handling requests for many output streams. It may also decide when to move specific titles from slow archival storage to faster temporary storage such as RAM or magnetic disks. It may further allow specific control during playback (for video on demand) such as pause, fast forward, and rewind. Some administrative functions performed by a typical video server include enumerating content, loading content from somewhere (which is one place proximity comes into play), unloading stale content (again subject to proximity concerns), and making content available to be transferred to other servers (again based on proximity considerations).

In an alternative embodiment, a remote video server application 607' may be resident on a remote network entity or host. In such case, the video server application may obtain the necessary support from network operating system 603 remotely, via a set of APIs, for example. Note that network device 601 includes at least one network interface 608, which allows communication between operating system 603 and remote video server application 607'. Interface 608 may also provide the physical connection allowing network communications between server 601 and a client 610.

Network device 601 also stores the video content that it must serve. In the specific example illustrated in FIG. 6, network operating system includes or communicates with one or more mass storage controllers 611, which in turn control access to specific mass storage systems. Here network entity includes three mass storage devices: a tape archive 613, an optical jukebox 615, and an array of magnetic disks 617. Other mass storage devices and configurations are of course possible. The stored video content may be compressed in a format such as MPEG-2.

A general discussion of video servers may be found in A. S. Tanenbaum, Computer Networks, Third Edition, Prentice Hall PTR, Upper Saddle River, N.J. (1996). This reference is incorporated herein by reference in its entirety and for all purposes.

It may be desirable to provide "equivalence classes" for various network entities that have roughly the same proximity to some arbitrary network location. If one knows IP subnetting information for example then, if one makes the assumption that all hosts on a subnet are equally distant, then one can create equivalence classes of servers or clients. Such IP subnet information is often disseminated by routing protocols. It is also available through other techniques, such as ICMP Subnet Mask Request packets and SNMP queries.

These equivalence classes can reduce the burden on content placement computations in that a decision made for one member of an equivalence class will frequently hold equally true for other members the class. In addition, should these classes contain information such as the subnet mask length and even the discovered number of members in the class, better decisions can be made regarding the effectiveness of various different anticipatory pre-loading options. For example, if a content control system has to chose between two different servers to pre-load, it would tend to elect to pre-load a server that is closer to a subnet with a higher number of potential clients, i.e., the one with the larger equivalence class of clients.

Although the foregoing invention has been described in some detail for purposes of clarity of understanding, it will be apparent that certain changes and modifications may be practiced within the scope of the appended claims.

What is claimed is:

1. A method of loading content to a server in anticipation of a need for the content by network clients, the method comprising:

determining the location of at least one client not currently requesting the content but that is likely to request the content;

determining a first proximity between the at least one client and a first server not currently storing but configured to store and serve the content;

determining a second proximity between the at least one client and a second server not currently storing but configured to store and serve the content; and based upon the relative values of the first and second proximities, loading the content into one of the first server or the second server from a third entity.

2. The method of claim 1, wherein the first and second proximities are determined dynamically by a content control system.

3. The method as recited in claim 1, wherein determining the location comprises:
    determining the location where clients are expected to subscribe to a service making the content available.

4. The method as recited in claim 1, wherein determining the location comprises:
    determining the location that is to receive a service making the content available.

5. The method as recited in claim 1, wherein determining the location is not performed using an activity schedule of the at least one client.

6. The method as recited in claim 1, wherein the at least one client includes a plurality of clients, and wherein the location is associated with the plurality of clients.

7. The method as recited in claim 1, wherein the location is a current location of the at least one client.

8. The method as recited in claim 1, wherein determining the location comprises:
    ascertaining that a service making the content available will be provided at the location.

9. A method of loading content to a server in anticipation of need by network clients, the method comprising:
    (a) determining the location of a client or group of clients that will require access to the content;
    (b) identifying a first server currently storing the content and serving the client's requirements for access to the content;
    (c) identifying a second server that does not currently store said content but that is configured to store and serve the content;
    (d) determining a first proximity between the first server and the client or group of clients;
    (e) determining a second proximity between the second server and the client or group of clients, wherein at least one of the first or second proximities is determined by at least one of the following factors, the factors weighted based on the type of content to be loaded: congestion, noise and loss on a network segment, or charges incurred to send; and
    (f) if the relative values of the first and second proximities meet a defined constraint, loading the content to the second server from a third entity.

10. The method of claim 9, wherein (d) includes determining whether the server and the client or group of clients are on the same sub-network.

11. A method of loading content to a server in anticipation of a need for the content by network clients, the method comprising:
    (a) determining the location of a client or group of clients that are likely to access the content;
    (b) determining the relative proximities of (i) the client or group of clients to a first server not currently storing but configured to store and serve the content and (ii) the client or group of clients and a second server not currently storing but configured to store and serve the content; and
    (c) based upon the relative proximities, loading the content into one of the first server or the second server from a third entity.

12. The method of claim 11, wherein the first and second proximities are determined dynamically by a content control system.

13. A method of selecting a server to fill a client request for content, the method comprising:
    (a) determining that one or more clients needs or will need to receive the content;
    (b) determining a first proximity between the one or more clients and a first server configured to supply the content;
    (c) determining a second proximity between the one or more clients and a second server configured to supply the content; and
    (d) based upon the relative values of the first and second proximities, choosing one of the first or second servers to receive the content from a third entity in order to be able to fill future client requests for the content, wherein at least one of the first or second proximities is determined by at least one of the following factors: congestion, noise and loss on a network segment, or charges incurred to send.

14. The method of claim 13, wherein the first and second proximities are determined dynamically by a content control system.

15. The method of claim 13, wherein the content is provided by the server that is most proximate to the one or more of clients.

16. The method of claim 13, wherein the content is multimedia content.

17. The method of claim 13, wherein at least one of the first and second proximities is determined by a combination of at least two of the following factors: bandwidth, number of hops, congestion, noise and loss on a network segment, and charges incurred to send.

18. The method of claim 13, wherein the first proximity is determined by a considering whether the first server and the one or more clients are on the same sub-network.

19. The method of claim 18, wherein content is provided by the first server when the first server and the one or more clients are on the same sub-network and the second server and the one or more clients are not on the same sub-network.

20. A method of loading content to a server in anticipation of a need for the content by network clients, the method comprising:
    predicting that at least one client is likely to request the content, wherein the at least one client is not currently requesting the content;
    determining a first proximity between the at least one client and a first server not currently storing but configured to store and serve the content;
    determining a second proximity between the at least one client and a second server not currently storing but configured to store and serve the content; and
    based upon the relative values of the first and second proximities, loading the content into one of the first server or the second server from a third entity.

21. The method as recited in claim 20, wherein predicting is not performed based upon scheduled activities of the at least one client.

22. The method as recited in claim 20, wherein predicting is performed based upon a location of the at least one client.

23. The method as recited in claim 22, wherein a service making the content available will be provided at the location.

* * * * *